United States Patent
Pepper et al.

(10) Patent No.: US 8,319,798 B2
(45) Date of Patent: Nov. 27, 2012

(54) SYSTEM AND METHOD PROVIDING MOTION BLUR TO ROTATING OBJECTS

(75) Inventors: Damyan Pepper, Brighton (GB); George Foot, Brighton (GB)

(73) Assignee: Disney Enterprises, Inc., Burbank, CA (US)

( * ) Notice: Subject to any disclaimer, the term of this patent is extended or adjusted under 35 U.S.C. 154(b) by 894 days.

(21) Appl. No.: 12/336,828

(22) Filed: Dec. 17, 2008

(65) Prior Publication Data

US 2010/0149184 A1 Jun. 17, 2010

(51) Int. Cl.
*G09G 5/00* (2006.01)
*G06T 13/00* (2011.01)
*G06K 9/32* (2006.01)

(52) U.S. Cl. ........ 345/649; 345/619; 345/606; 345/473; 382/296

(58) Field of Classification Search .................. 382/264, 382/296; 345/473–475, 422, 426, 606–611, 345/619, 646–647, 649, 652, 689
See application file for complete search history.

(56) References Cited

U.S. PATENT DOCUMENTS

| | | | |
|---|---|---|---|
| 7,071,938 B2 | 7/2006 | Herken et al. | |
| 7,227,544 B2 | 6/2007 | Alkouh | |
| 2003/0007701 A1* | 1/2003 | Herf | 382/299 |
| 2006/0227144 A1 | 10/2006 | Bleiweiss | |
| 2009/0063104 A1* | 3/2009 | Jo et al. | 703/1 |

OTHER PUBLICATIONS

Nguyen "GPU Gems 3", Addison-Wesley, ISBN-13: 978-0-321-51526-1, 2007.*
Zorin, class note: http://web.archive.org/web/20060902203955/http://mrl.nyu.edu/~dzorin/cg05/lecture12.pdf, 2006.*
Loviscach, "Motion Blur for Textures by Means of Anisotropic Filtering", Rendering Techniques 2005, Eurographics Symposium on Rendering, pp. 105-110.*
Damyan Pepper, Per-Pixel Motion Blur from Wheels, ShaderX6—Advanced Rendering Techniques, Section 3 Image Space: 3.4, p. 175-189, publication date: Feb. 15, 2008.*
Author Unknown, "Motion blur", Wikipedia, http://en.wikipedia.org/w/index.php?title=Motion_blur&printable=yes, 2 pages, at least as early as Mar. 17, 2008.
Zagier, Ellen J. Scher, "A Human's Eye View: Motion Blur and Frameless Rendering", The ACM Student Magazine, http://www.acm.org/crossroads/xrds3-4/ellen.html, 10 pages, at least as early as Mar. 17, 2008.

* cited by examiner

*Primary Examiner* — Tize Ma
*Assistant Examiner* — Yingchun He
(74) *Attorney, Agent, or Firm* — Dorsey & Whitney LLP

(57) ABSTRACT

In graphics applications, objects including rotating objects having geometric detail or surface relief are rendered in render targets where pixels are assigned color and depth values by color and depth buffers. A pixel shader performs ray intersection calculations on a primitive approximating the object in the render target to generate three-dimensional world space positions for the pixels. Samples for each pixel are taken around a primitive's axis of rotation, and for each sample, the object in the render target is queried to gather color and depth data for the pixel. The query results are composited and a blurred object is provided in a scene at a desired location and at a depth according to depth data retrieved from the depth buffer.

10 Claims, 11 Drawing Sheets

SYSTEM AND METHOD PROVIDING MOTION BLUR TO ROTATING OBJECTS

FIELD OF THE INVENTION

The present invention involves providing a blurring technique to objects in computer graphics applications. In particular, a blurring technique blurs an object through a two-dimensional post-process accounting for radial movement of the object.

BACKGROUND

Motion blur is the visibly perceptible result of rapidly moving objects. This effect is seen as streaking or blurring in still images and in film, and is caused when the exposure time of a video camera is slow relative to an object's movement. In computer animation, however, exposure limitations are not present and moving images depicted in a scene are typically shown without motion blur. In order to depict motion blur in computer animations, computer animation systems apply motion blur techniques. For example, some motion blur techniques involve full-screen motion blur by determining a screen-space velocity, while others involve calculating velocity based on a camera's movement.

Techniques used for blurring computer animation are often limited by the capabilities of computer memory. Graphics processing units (GPUs) and software applications are required to share memory with other components, and in motion blur techniques, computer graphics are sampled several times in order to apply motion blur to animations, thus requiring a significant amount of memory.

In addition, computer processors are used by several computer applications that are in addition to software applying blurring techniques, and because these techniques require computer graphics to be repeatedly rendered, processors can be burdened by animation software requirements.

Memory and processor limitations aside, conventional computer graphic-based motion blur techniques are applied to objects moving linearly. FIG. 1A depicts samples 101, 102, 103, 104 taken of a moving object 100 along a linear direction, i.e., the objects' direction of movement, for generating a linear blur. For wheels rotating in computer animation, the wheel's movement is radial rather than linear. Applying blur techniques to objects not moving linearly do not depict realistic motion blurring. FIG. 1B depicts samples 101, 102, 103, 104 taken in a linear direction for a wheel 105 moving radially, resulting in samples taken from the background 110 as opposed to wheel 105. In addition, computer animated wheels rotating on a screen often stay in the same position on the screen, while the environment appears to move across the screen. As a result, realistically depicting rotating wheels with motion blur can be desirable for a viewer because the vehicle associated with the wheels and the wheels themselves may be viewed on the screen for a long period of time.

Some computer games centered around racing cars and motorcycles avoid sampling of rotating wheels and address some of the above problems by substituting detailed wheels with wheels having less detailed, streaky blurred wheels when wheels are to be depicted as rotating rapidly. However, for computer applications depicting animated wheels having a relief pattern such as knobs, substituting wheels with blurred texture is not a realistic substitute since the space between the knobs needs to be blurred and a texture cannot be applied to empty space. Accordingly, there is a need for motion blurring techniques to textured rotating objects having a relief pattern that do not overburden memory or processing capabilities.

SUMMARY

According to certain embodiments of the present invention, a computer system and computer implemented method for performing motion blur to objects rendered on a screen to depict a blurred texture (e.g., detail, surface texture and/or color) for the object.

According to certain embodiments, a computer implemented method for motion blurring rotating objects in a scene includes rendering an object in a render target, the render target comprising color and depth buffers; performing calculations on the object in the render target to generate one or more three-dimensional world space positions for a pixel; sampling the pixel around an axis of rotation using data from the color and depth buffers in the render target; and compositing the results to provide an object with a blurred texture in a scene at a location and depth on a computer screen according to location and depth information from color and depth buffers.

In some embodiments, a computer implemented method for motion blurring a rotating wheel on a screen includes rendering a wheel to an off-screen render target, the render target comprising a color buffer and a depth buffer; rendering the remainder of a scene to a main render target; performing blurring calculations using a primitive to blur the wheel while compositing the wheel texture into the scene using the depth data from the depth buffer.

In further embodiments, a computer implemented method for motion blurring includes providing a graphics processing unit comprising a pixel shader, where the graphics processing unit in combination with the pixel shader performs the steps of rendering a wheel in an off-screen render target as a sprite or a primitive; performing a ray intersection of a ray extending though a camera into the render target to find the location on the object where the ray intersects, where the intersection point provides a three-dimensional position of a pixel being shaded; querying an off-screen render target using the three-dimensional position of the pixel to retrieve color and depth data for a corresponding texel identified around a plurality of points along the wheel's axis; compositing the results to provide an object with a blurred texture in a scene at a depth according to depth data retrieved from the depth buffer.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Aspects of the present invention provide a computer system and computer implemented method for performing motion blur to objects rendered on a screen. Motion blurring techniques, according to certain embodiments, may be provided in applications such as video games, animations, movies, and computer graphics. Various aspects of the invention are described further below with reference to various possible implementations and the associated figures.

Figure 2:
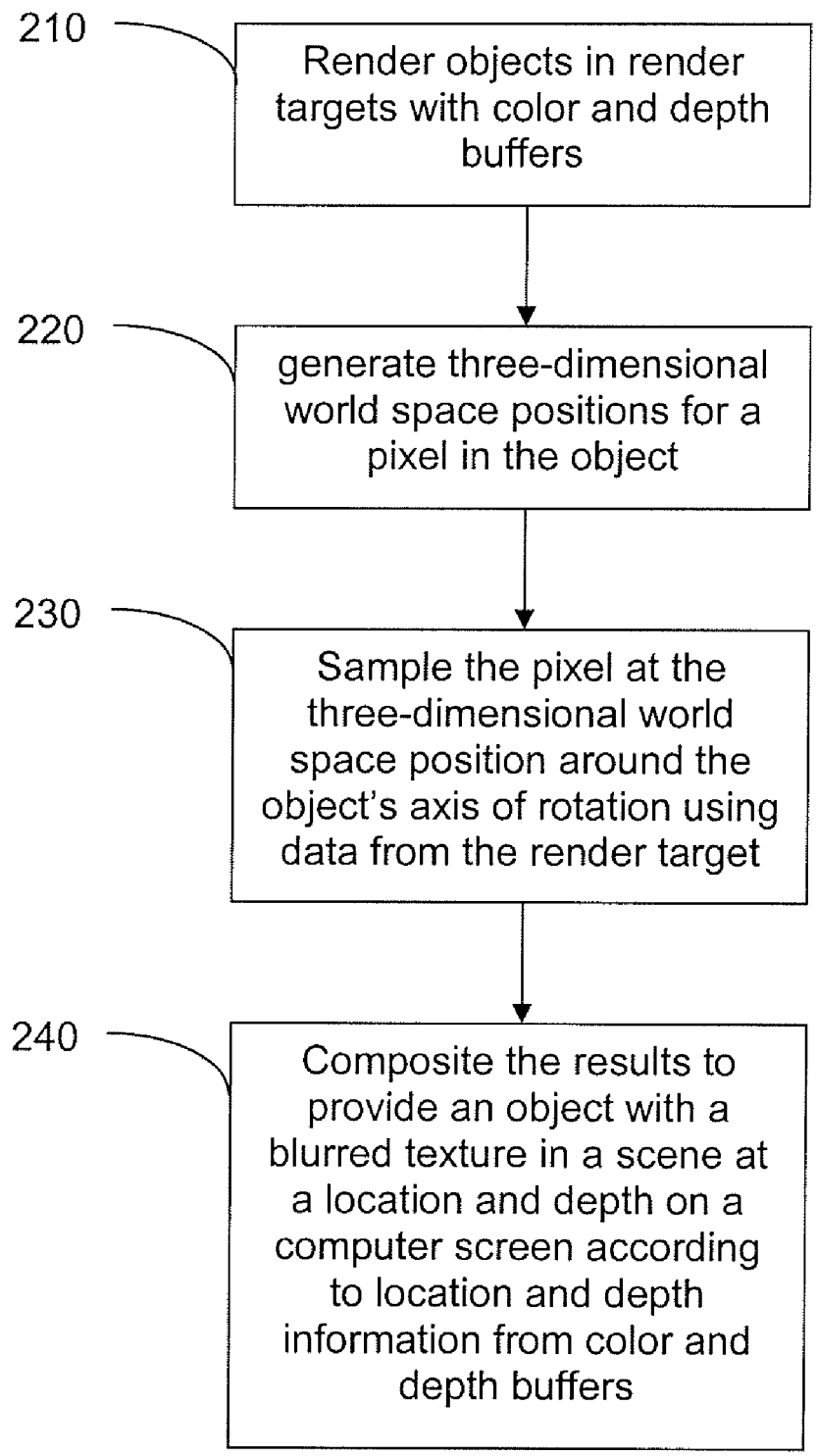
FIG. 2 is a flowchart of a method for applying motion blur to an object according to certain embodiments.

A primary objective in computer graphics is to make two-dimensional objects in a computer animation scene appear as three-dimensional objects. Two-dimensional objects are composed of a multiplicity of pixels, and in order to make the object appear three-dimensional, the coloring and shading of the pixels in the object may be adjusted to make the object in a scene appear closer to the viewer or further away, i.e., further in the computer screen. FIG. 2 provides a method for motion blurring rotating two-dimensional objects, e.g., an animated wheel, from a computer animation scene so that the objects appear to be motion blurred, rotating three-dimensional objects. The method of FIG. 2 involves rendering a two-dimensional object from a scene in a render target having associated color and depth buffers (operation 210), generating one or more three-dimensional world space positions for a pixel in the object (operation 220), and sampling the pixel around the object's axis of rotation at a number of rotational positions at the generated three-dimensional world space position by retrieving sets of color and depth data from the color and depth buffers for each of the plurality of rotational positions sampled (operation 230). Compositing the retrieved sets of color and depth data provides an object with a blurred texture (e.g., blurred detail, surface texture and/or color) in a scene (operation 240).

In operation 210, rendering an object to be blurred in a render target involves memory processes in which a buffer, such as a back buffer or an off-screen render target, containing a next frame of an object to be drawn, draws pixels for an object being rendered on a screen. Object data, such as the object's pixel color and depth data from color and depth memory buffers may be associated with the render target.

After the object is rendered in the render target, the method of FIG. 2 involves generating one or more three-dimensional world space positions for a pixel in the object (operation 220). Three-dimensional world space positions may be generated by performing calculations in a two-dimensional post-process on a primitive representing the object. Performing calculations in a two-dimensional post-process involves calculating the three-dimensional position (e.g., x, y and z coordinates) of an object's pixel using known values including: two-dimensional location of the object's pixel on the screen (e.g., using y and z, x and y, or z and x coordinates) (near clip pane), the distance the screen is from the camera (the far clip pane) and the shape of the screen (the width and height), the approximate shape of the object, e.g., a wheel may be approximated by a capped cylinder, and the location of the object in three-dimensional space. Calculation of the three-dimensional location of the pixel involves finding the intersection point between the pixel and of a ray, which starts from the camera (i.e., from a single point where a camera or viewer would be positioned in order to provide the view of or see what is depicted on the computer screen), and extends from the camera through the object's pixel on the screen. According to certain embodiments, known values, along with equations provided below enable the three-dimensional location to be calculated.

Once the three-dimensional world space positions for the object's pixels are located, the method involves sampling the pixel around the object's axis of rotation at a number of rotational positions at the three-dimensional world space position by retrieving sets of color and depth data from the color and depth buffers for each of the plurality of rotational positions sampled (operation 230). Sampling the pixel around the axis of rotation, according to certain embodiments, may involve retrieving multiple sets of data from color and depth buffers associated with the render target that are related to the color and depth of a pixel that corresponds to the same radial position, i.e., the same distance from the object's axis of rotation, at different rotational positions. That is, the three-dimensional position of the pixel is sampled around various points of the object containing the pixel; each of the various points are located the same distance from the axis, but are located at various rotational positions around the object's axis of rotation.

Finally, the method of FIG. 2 involves compositing the retrieved set of color and depth data for the pixel to provide the object with a blurred texture in the scene (operation 240). Compositing may further provide the object at a location and depth on a computer screen according to location and depth information from color and depth buffers. Compositing the pixel samples, in certain implementations, involves averaging data retrieved related to the pixels sampled.

Figure 3:
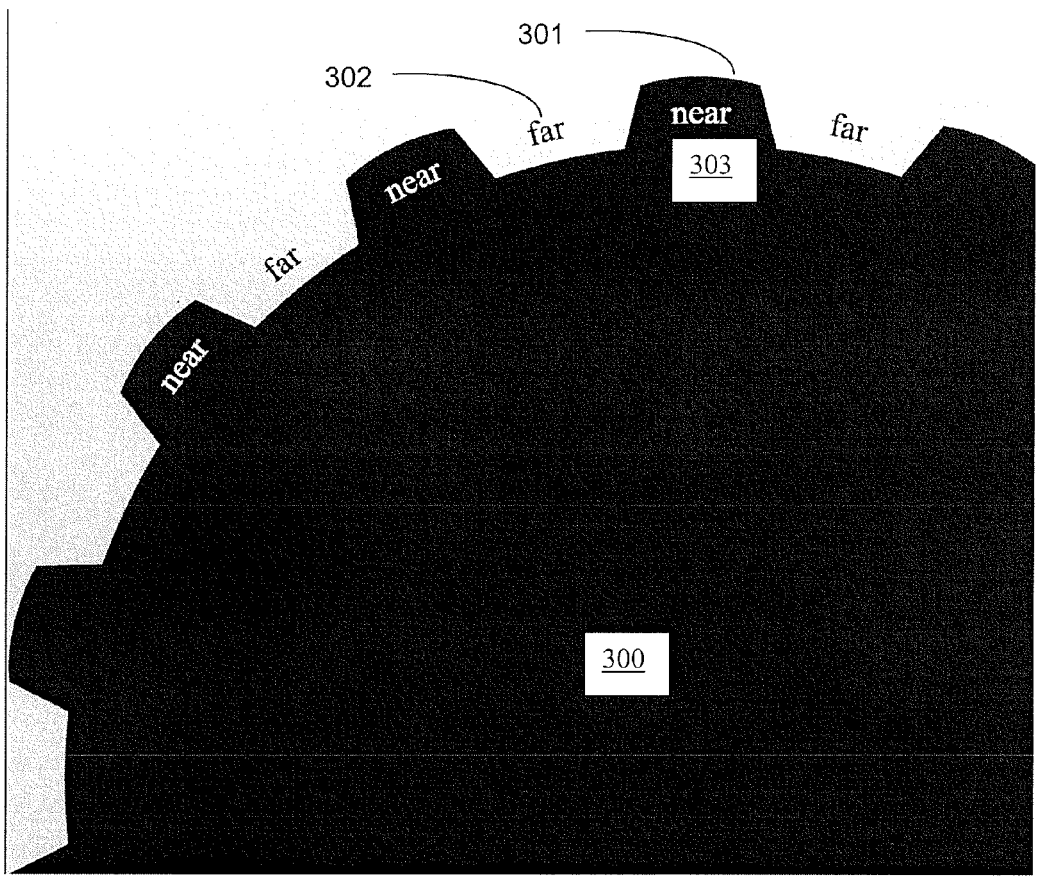
FIG. 3 depicts a portion of a wheel 300 having surface features.

Certain implementations apply motion blurring techniques to objects depicted as rotating along an axis, including rotating objects having geometric detail or surface relief, resulting in a need for the object rendered to be depicted as having rotational blur that takes into account geometric details or surface relief, where present. Objects moving on a screen may include spinning, vibrating and/or swinging objects, which appear to stay at a substantially fixed position with respect to a screen, while background images around the spinning object move through or across the screen. Such an arrangement may involve the spinning or rotating objects being followed by a camera. That is, spinning objects followed by a camera remain on a screen because a camera follows the spinning object at the same speed and, in some instances, the same direction, as the object. The description below provides embodiments of the invention applying the motion blurring technique to rotating wheel having a wheel texture (e.g., surface texture or features) that includes knobs, see wheel 300 of FIG. 3 with knobs 301. A pixel shader applies motion blur techniques to rotating objects using a capped cylinder primitive, which, in the present example, approximates the shape of a wheel, including wheel 300 having knobs 301 and/or another relief pattern. However, the motion blur techniques set forth herein may be applied to a variety objects and primitives in which a realistic depiction of rotational blur is desired. For example, primitives such as ellipsoids, cylinders, capped cylinders, spheres, cubes, torus, cones, truncated cones, planes, circles, and intersecting primitives such as intersecting ellipsoids, an intersecting ellipsoid and two planes, with or without surface features, may be used to represent a variety of moving objects.

Figure 4:
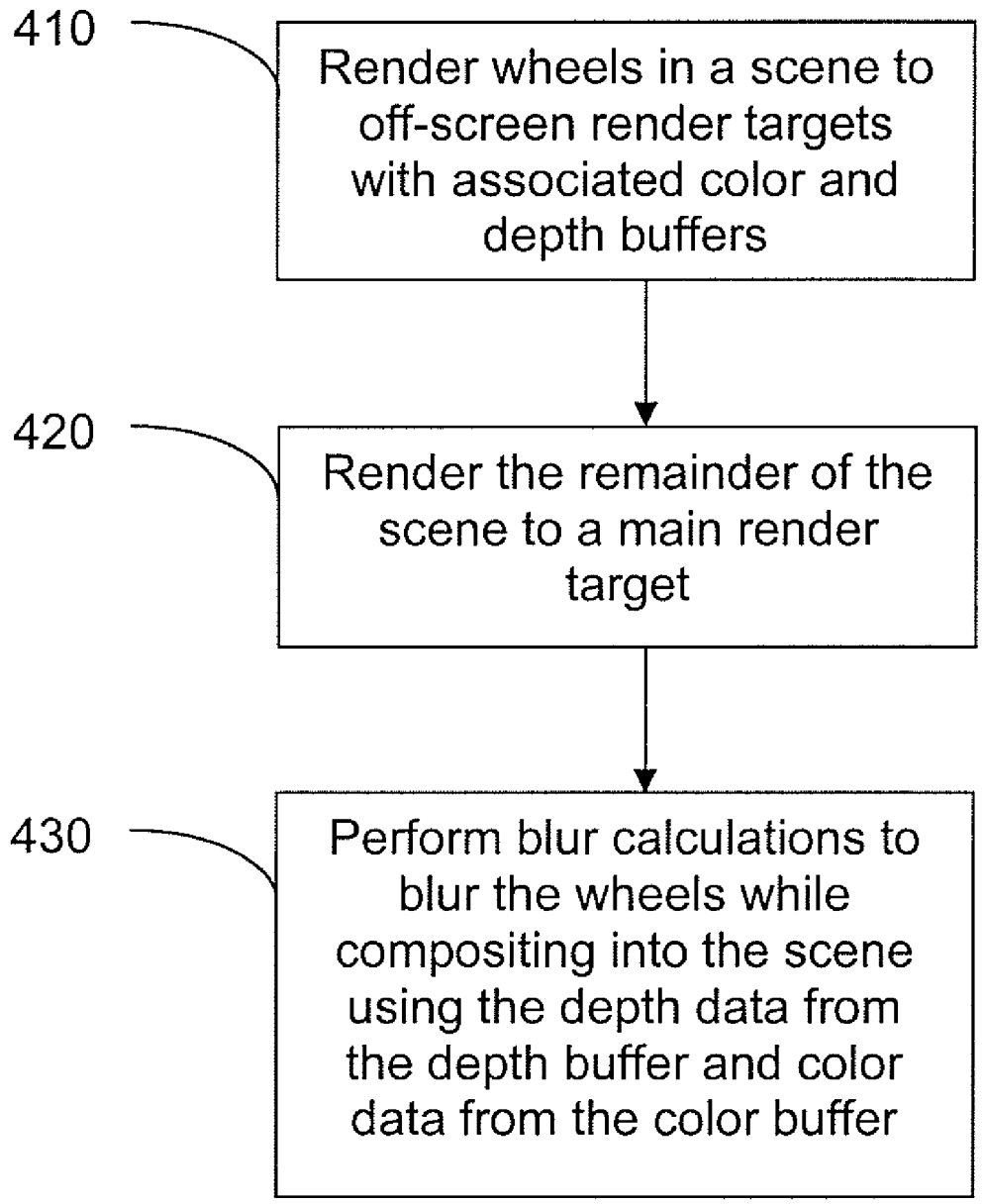
FIG. 4 is a flowchart of a method for depicting a scene with blurred wheels according to certain embodiments.

Another method for motion blurring, according to certain embodiments, is provided in the flowchart of FIG. 4. According to FIG. 4, the method includes rendering wheels from a scene to off-screen render targets with associated color and depth buffers (operation 410), and rendering the remainder of the scene, e.g., a motorcycle, to a main render target (operation 420). A wheel blur pixel shader uses a capped cylinder primitive to approximate the shape of a wheel, performs blurring calculations, and blurs a wheel while compositing the wheel texture (e.g., wheel detail, wheel surface texture and/or wheel color) into the scene using a set of depth data from the depth buffer and a set of color data from the color buffer (operation 430).

Rendering the wheels to off-screen render targets (operation 410) involves providing wheel data to an off-screen render target, e.g., a portion of the GPU memory that performs various processes on the wheel. Rendering the remainder of the scene to a render target (operation 420), such as a motorcycle or other vehicle, may be performed in a similar manner compared to operation 410, but the motorcycle is rendered in a separate render target.

Blurring the wheel while compositing the wheel into a scene (operation 430) involves performing calculations on data available to the pixel shader. This is done by calculating where each pixel would have been on the wheel in three-dimensional space, and this three-dimensional position of the wheel pixel is a certain distance from the wheel's axis (e.g., radial distance) and thus from the wheel's axis of rotation. The three-dimensional position is then used to take some number of samples of the wheel around the wheel's rotational axis, with each sample having the same radial distance from the axis as the initially calculated three-dimensional position. Each sample is projected back onto the texture and the samples (e.g., color and depth data associated with each sample) are averaged to produce the blurring effect.

Figure 5:
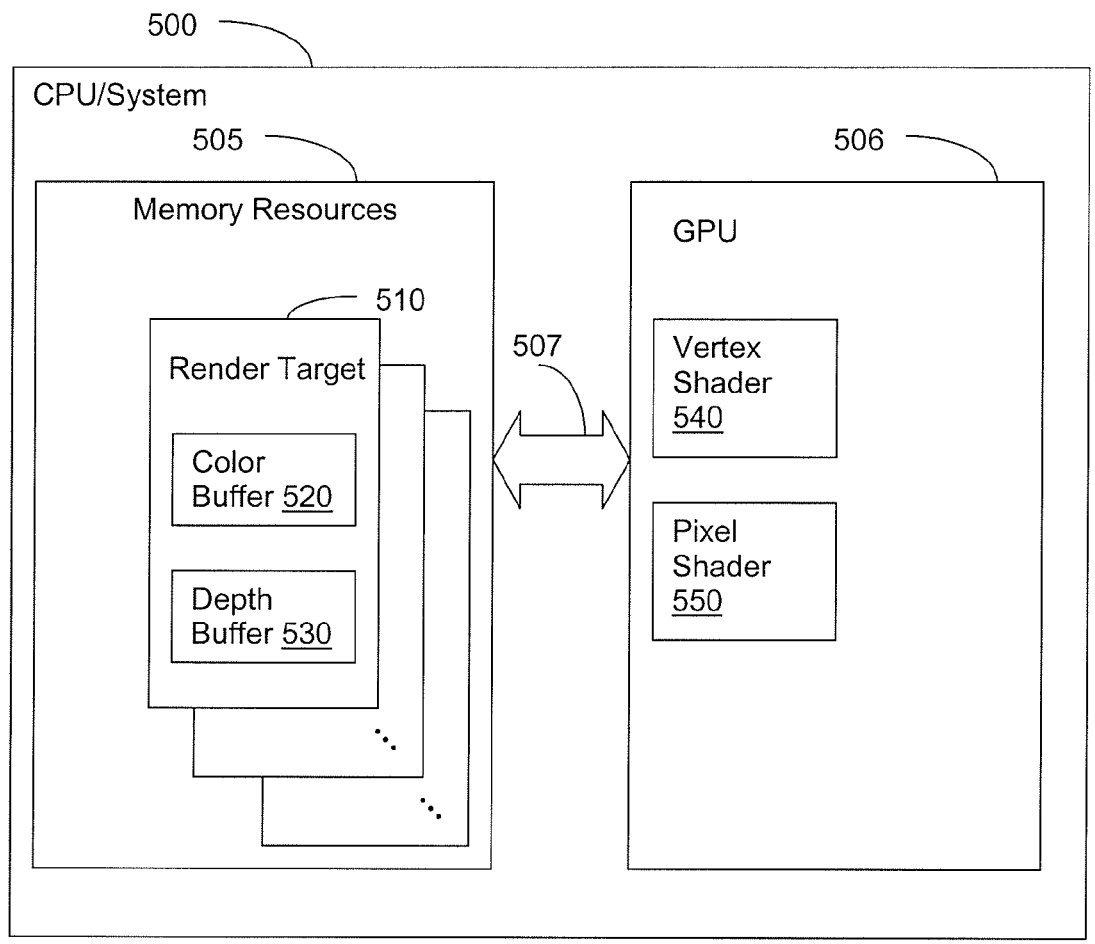
FIG. 5 depicts components comprising a graphics processing unit (GPU) for performing wheel blurring functions.

In certain implementations, all or a portion of the methods described herein, including the methods of FIGS. 2, 4 and 6 (described below) may be carried out in a GPU controlled by a CPU, or other computer processing environment. With reference to FIG. 5, CPU/system 500, with memory resources 505, is communicatively coupled to GPU 506 via data bus 507. GPU 506 includes hardware and software components for providing processing of graphics data in a scene. Memory resources 505 may include components such as render targets 510, and associated color buffers 520 and depth buffers 530 for receiving objects to be rendered off-screen. The GPU accesses the various memory resources 505 via data bus 507 in order to perform rendering, calculating, sampling and compositing functions. GPU 506 may include image processing components such as: vertex shader 540 for generating shading data for geometric surfaces and/or a pixel shader 550 for receiving data for a primitive and transforming primitives on a per-pixel basis into two-dimensional image space. These or other image processing components, including those components used in a standard rendering pipeline, such as a geometry shader, may be used according to the present implementation.

Render target 510, according to certain implementations, may be dedicated to particular features, such as wheels, which are to be blurred. When a wheel, for example, is provided in render target 510, the assigned color buffer 520 determines the color and transparency of pixels for rendering on a screen. For example, wheel pixels may be assigned a color, e.g., yellow, and a transparency, e.g., alpha value of between 0 and 1 by the color buffer. In addition, wheels may be surrounded by transparent pixels for identifying which pixels are part of the wheel and which are not. Depth or Z-buffer 530 assigned to render target 510 stores image depth coordinates in three-dimensional graphics. This facilitates the CPU/GPU in determining which elements or parts of elements of a wheel are rendered in a scene and which wheel elements are hidden or occluded. From the depth buffer, pixels are assigned a depth, e.g., 0.2 into the screen, and whether a pixel is occluded by another pixel, e.g., blocked by another pixel that is at a depth of 0.1 in the screen. Wheel pixel depth data assists the rendering process because when a wheel is rendered on the screen by compositing, other portions of the vehicle (e.g., the front fork of a motorcycle) will need to appear in front of the wheel, and the wheel depth data may be compared with the motorcycle depth data to determine the portions of the wheel to be occluded. Pixel data, including wheel pixel color information from color buffer 520 and depth information from the depth buffer 530 may be read back by GPU components, including pixel shader 550, in order to reconstruct the depth of a visible pixel. Accordingly, GPU 506 components, including pixel or fragment shader 550, may query the color buffer 520 and/or depth buffer 530 to retrieve pixel color and/or depth values and process wheel pixel data on a per-pixel basis.

Vertex shader 540 performs rendering processes on objects on a per-vertex basis. Vertices are the corners of polygons, and a mesh of polygons (e.g., polygonal mesh) defines the shape of the object in three-dimensional space. Vertex shader may perform per-vertex operations in order to modify the color, texture and/or positioning of a vertex in space. Vertex shaders project the vertex coordinates from three-dimensional space to the two-dimensional space used in the texture. It should be understood that because a vertex may be associated with more than one polygon, a vertex may be associated with multiple sets of color, texture and/or positioning data, i.e., vertex shader may assign data to the same vertex for each of its associated polygons.

Pixel shader 550, according to embodiments of the present invention, may be configured to perform motion blur data calculations on pixels and composite objects in a scene using the data generated by the pixel shader 550 and by the components 520, 530 associated with render target 510. As discussed in more detail below, the motion blur technique applied to wheels having a rotational velocity accounts for the radial motion of the wheels rendered on a screen during a compositing process.

Figure 6:
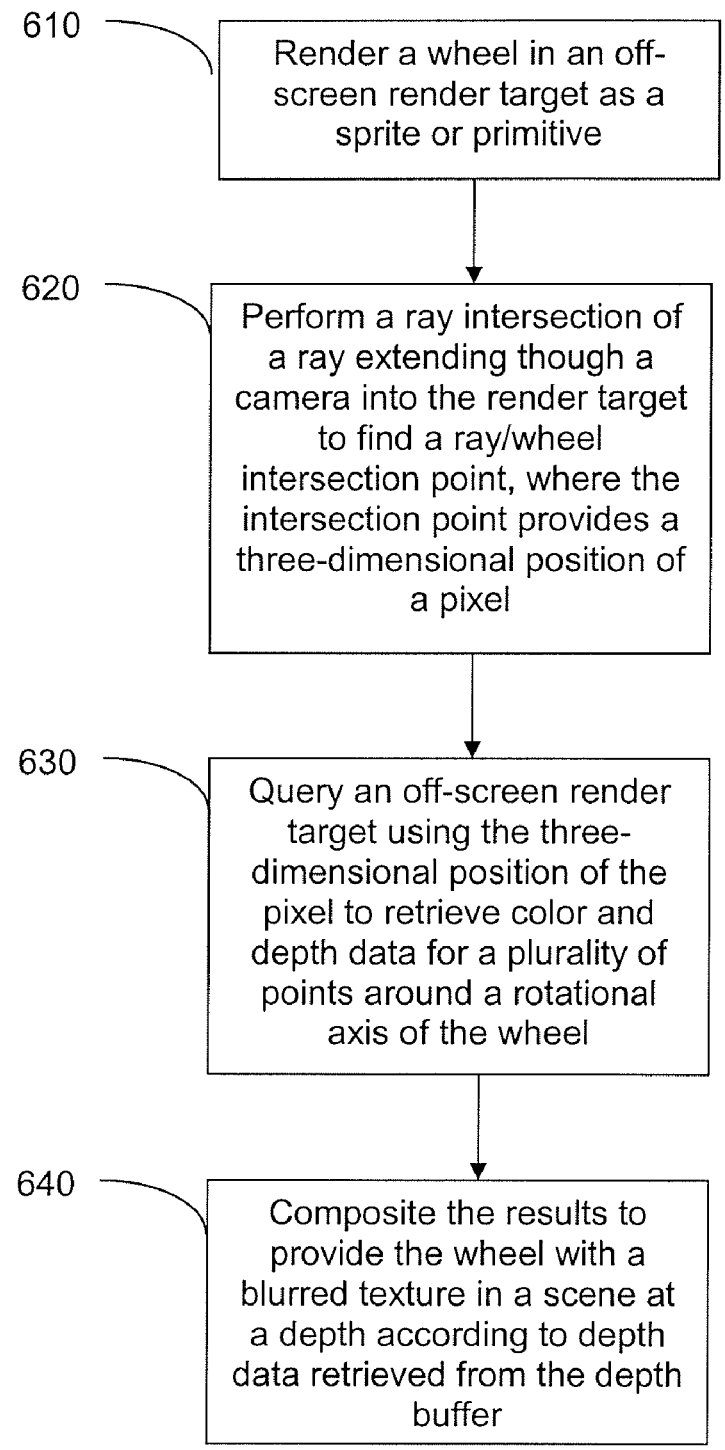
FIG. 6 is a flowchart of a method for a motion blur technique according to certain embodiments.

With reference to the flowchart of FIG. 6, a blurring method may involve the pixel shader rendering (610) a wheel in the off-screen render target as a sprite or primitive. A ray/wheel intersection calculation may be performed (620) for a ray extending though a camera into the object in the render target to find a ray/wheel intersection point, e.g., the location where the ray and wheel intersect, or a location closest to where the ray and wheel intersect. The intersection point provides a three-dimensional position of the pixel being shaded. Using the three-dimensional position of a pixel, an off-screen render target is queried (630) to retrieve sets of color and depth data for the identified pixel (or texel, i.e., a pixel from the texture of the three-dimensional object), and the query is executed so that color and depth data is retrieved at different points around the wheel's axis of rotation. The retrieved data is composited (640) resulting in the rotating wheel being provided with a blurred texture in a scene at a depth according to depth data retrieved from the depth buffer.

Figure 7A:
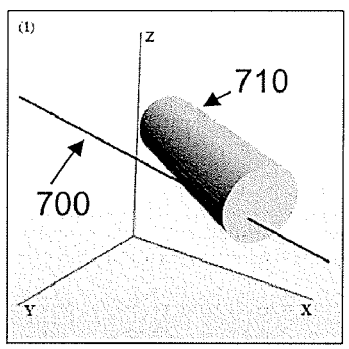
FIGS. 7A-C depict views of a ray intersection of a cylinder.
Figure 7B:
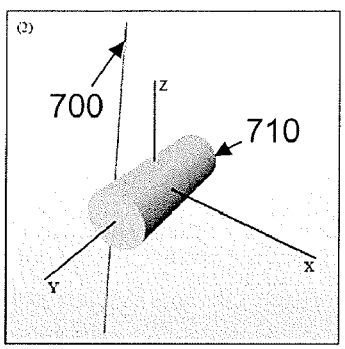

According to the present example, the pixel shader uses a capped cylinder primitive to approximate the shape of a wheel, and the intersection point calculated (620) is a ray/cylinder intersection point, which provides a three-dimensional position of a wheel pixel being sampled. More particularly, the pixel shader calculates the ray/cylinder intersection using the capped cylinder primitive and identifies the intersection of a line projected from the camera through a pixel/texel being shaded. FIG. 7A depicts a three-dimensional view of a ray 700 intersecting a cylinder 710. FIG. 7B depicts the cylinder 710 and ray 700 rotated so that the axis of the cylinder 710 is oriented along the y-axis and centered on the origin, i.e., the point where the x, y, and z axes intersect. The resulting ray/cylinder intersection, depicted in FIG. 7C, becomes a two-dimensional equation because the ray 700 intersects the cylinder 710 along an x, z coordinate. The line and cylinder intersection is thus turned into a two-dimensional equation and becomes easier to solve than a three dimensional equation. This realignment is accomplished by first transforming the line's origin to make it relative to the cylinder's origin, and then transforming the position and direction by the inverse of the wheel's rotation matrix (i.e., a real square matrix). The transformation process effectively puts the line into "cylinder space."

Figure 7C:
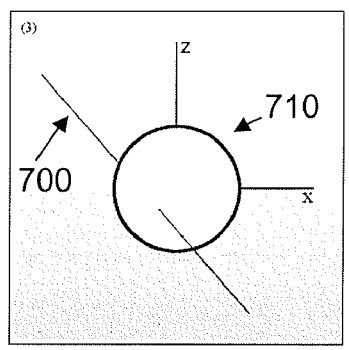

For a ray, the pixel shader may use a two-dimensional line equation with origin and direction data. In the embodiment of FIG. 7C, the origin of the line is the camera's world position. Determining the direction of the ray involves determining the direction of the line from the camera's position through the position of the texel being shaded. The position of the texel is determined using the coordinates of the texel (the three-dimensional model UV coordinates of the two-dimensional image), the viewport (i.e., the region of the screen that the wheel texture is located), and the camera's rotation matrix, which defines the direction the camera is pointed or facing. According to certain embodiments, a high level shading language (HLSL) function to determine the orientation of the line from the camera through a texel being shaded may be as follows (where the symbol "//" denotes a comment about function following the comment):

```
float3 getWorldDir( float2 zUV ) //
{
    // adjust UV from viewport to full-screen
    float2 screenUv = ( zUV * ViewportSize ) + ViewportOffset;
    // move from UV space (0 to 1) to screen space (-1 to 1)
    float2 screenPos = -(screenUv - 0.5) * 2.0;
    // the projection matrix's [ 0 ] [ 0 ]
    float w = CameraConstants.x;
    // the projection matrix's [ 1 ] [ 1 ]
    float h = CameraConstants.y;
    // adjust for aspect ratio
    float aspect = w / h;
    screenPos.x *= aspect;
    screenPos.y /= aspect;
    // work out up/right amounts
    float up = screenPos.y / h;
    float right = screenPos.x / w;
    return normalize(
        CameraFront + CameraUp * up - CameraRight * right );
}
```

For a cylinder, e.g., a circle extending parallel along its axis, in the ray/cylinder intersection calculation, the radius and height of the cylinder may be determined or provided. A cylinder approximating a wheel has an axis that is the same as the wheel's rotational axis at the center of the wheel, and the radius and height may be explicitly provided or identified for a wheel. In order to arrange the cylinder along one of the world axes centered on the origin, a line's origin may be transformed so that it is relative to the cylinder's origin, and the position and direction by the inverse of the wheel's rotation matrix may be transformed. The transformation arranges the line in "cylinder space" and allows the cylinder intersection calculation to be a two-dimensional calculation in the XZ plane of "cylinder space." Accordingly, the equation of a circle is:

$$r^2 = x^2 + z^2 \qquad (1)$$

The equation of a line in the XZ plane is:

$$x = P_x + tD_x$$

$$z = P_z + tD_z \qquad (2)$$

where P is the world position in the respective x and z axis, t is the variable parameter and D is the direction of the line in the respective x and z axis. Inserting equation 1 into equation 2 yields equation 3:

$$r^2 = (P_x + tD_x)^2 + (P_z + tD_z)^2 \qquad (3)$$

Solving for t in Equation 3 provides the following result.

$$t = \pm \frac{\sqrt{r^2(D_Z^2 + D_X^2) - D_X^2 P_Z^2 + 2D_X D_Z P_X P_Z - D_Z^2 P_X^2} - D_Z P_Z - D_X P_X}{D_Z^2 + D_X^2} \qquad (4)$$

Equation 4 is used in the HLSL function provided below to find the value of t that should be used in equation 2 in order to find the ray/cylinder intersection point.

In order to choose the intersection point nearest the camera's position, the lowest value of t is chosen, which may be a negative value. After solving for t, t may be plugged into Equation 2 to determine the x and z values of the intersection point between the line and cylinder. It should be noted, if the discriminant is negative, then no intersection between the circle and line resulted. Further, in cases where the denominator is zero, the line is parallel to the cylinder's axis.

According to certain embodiments, once the ray/cylinder intersection point has been calculated, a determination is made as to which part of the wheel was intersected, the cylinder or one of the caps (recall the primitive used to represent a wheel in the present embodiment is a capped cylinder). If the absolute value of the cylinder space y-coordinate is greater than the cylinder height, then the value of t is calculated according to Equation 6. Equation 5 solves for where the intersection point is in terms of the height of the cylinder. This result also shows whether the point is inside or outside of the cylinder.

$$y = P_Y + tD_Y \qquad (5)$$

where y is the cylinder space y-coordinate, where $P_Y$ is the y-coordinate of the intersection point after it has been transformed into cylinder space, t is the variable parameter, and $D_y$ is the direction of the line in the y-axis. Equation 6 returns the value of t (that can be plugged into equation 2) for the point clamped to the cap of the cylinder.

$$h = |P_Y + tD_y|$$

$$t = -\frac{P_Y \pm h}{D_Y} \qquad (6)$$

For the height of the cylinder, h, in Equation 6, where t is solved for, the sign should be that found in the calculation of Equation 5 in order to represent whether it is the "top" or "bottom" of the cylinder. A positive result in Equation 5 yields a "+" for h in Equation 6, and a negative result in Equation 5 yields a "−" for h in Equation 6.

According to certain implementations, a HLSL function for performing the line/cylinder intersection in order to identify a three-dimensional position of a texel being shaded, the "texel three-dimensional position computational method," may be provided as follows:

```
float3 lineCylinderIntersection(
    float3 zLinePoint,
    float3 zLineDir,
    float3 zCylinderPos,
    float zCylinderSqRadius,
    float zCylinderHeight,
    float3x3 zCylinderInvRot )
{
    // Transform the line origin and direction into the cylinder's
    // space
    float3 linePoint =
        mul( zLinePoint − zCylinderPos, zCylinderInvRot );
    float3 lineDir =
        mul( zLineDir, zCylinderInvRot );
    float PX = linePoint.x;
    float PZ = linePoint.z;
    float DX = lineDir.x;
    float DZ = lineDir.z;
    float rSquared = zCylinderSqRadius;
    float discriminant =
        ( DZ * DZ + DX * DX ) * rSquared −
        (DX * DX) * (PZ * PZ) +
        2 * DX * DZ * PX * PZ −
        (DZ * DZ) * (PX * PX );
    IntersectionResult result;
    if ( discriminant < 0 )
    {
    // no collision
    return zLinePoint;
    }
    else
    {
        float t =
            ( −sqrt( discriminant ) − DZ * PZ − DX * PX ) /
            ( DZ * DZ + DX * DX );
        float height = linePoint.y + lineDir.y * t;
        if ( abs(height) > zCylinderHeight )
        {
            // one of the 'caps'
            float t =
                linePoint.y −
                zCylinderHeight * sign(height) /
                −lineDir.y;
            return zLinePoint + zLindeDir * t;
        }
        else
        {
            // the cylinder itself
            return zLinePoint + zLineDir * t;
        }
    }
}
```

Figure 8A:
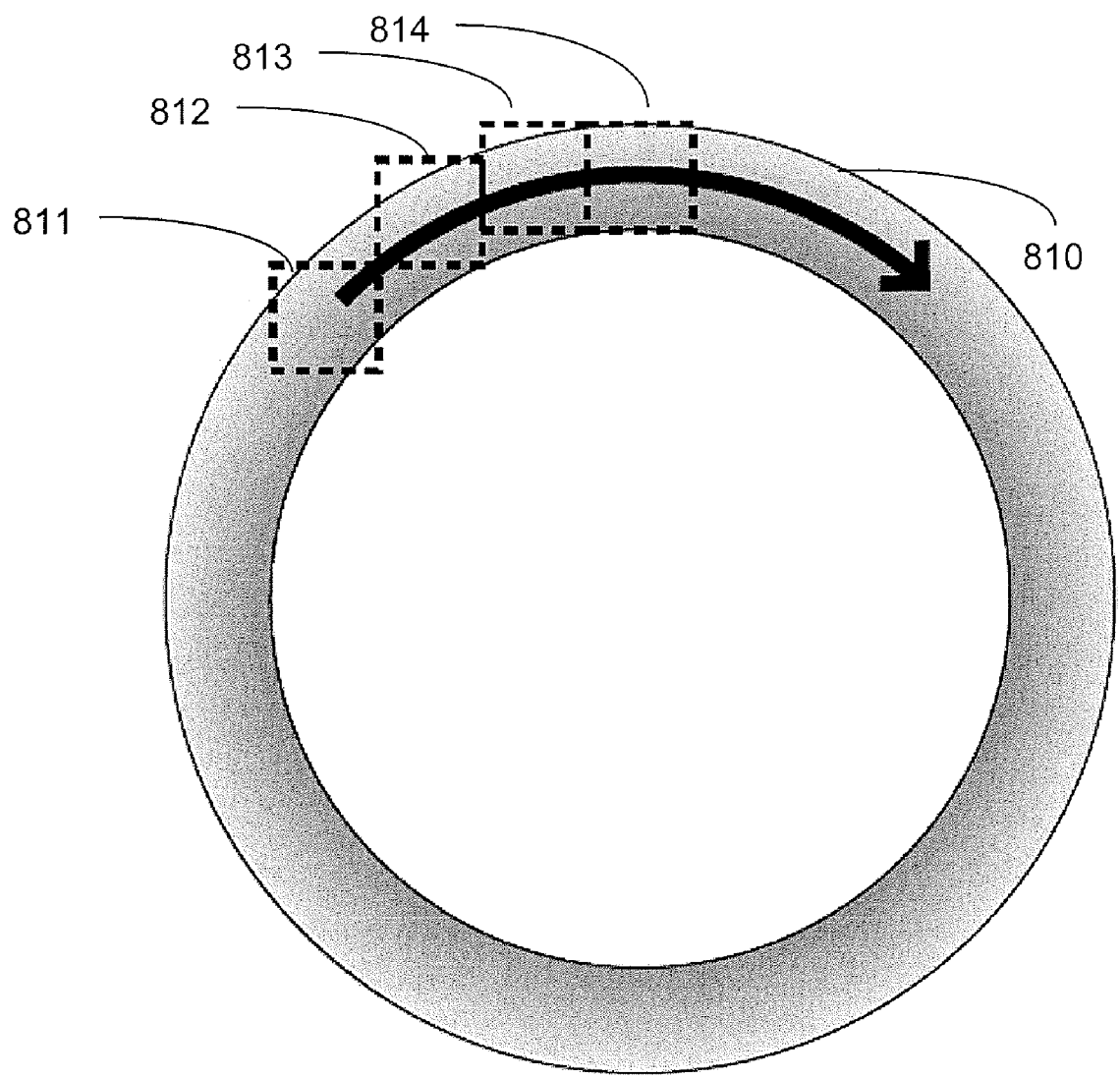
FIG. 8A depicts samples taken along a rotational axis for generating rotational blur according to certain embodiments of the invention.

Upon obtaining the three-dimensional position for a pixel using ray intersection calculations, a three-dimensional position of a pixel may be identified and the pixel may be sampled at multiple points along a rotational axis, which allows averaging of wheel color, and enables objects rendered on a screen to be shown with a rotational blur. FIG. 8A graphically depicts pixel sampling 811, 812, 813, 814 along a rotational axis from wheel primitive 810, which enables the motion blur technique of the present invention to provide a radial blur, as is described further below.

Figure 8B:
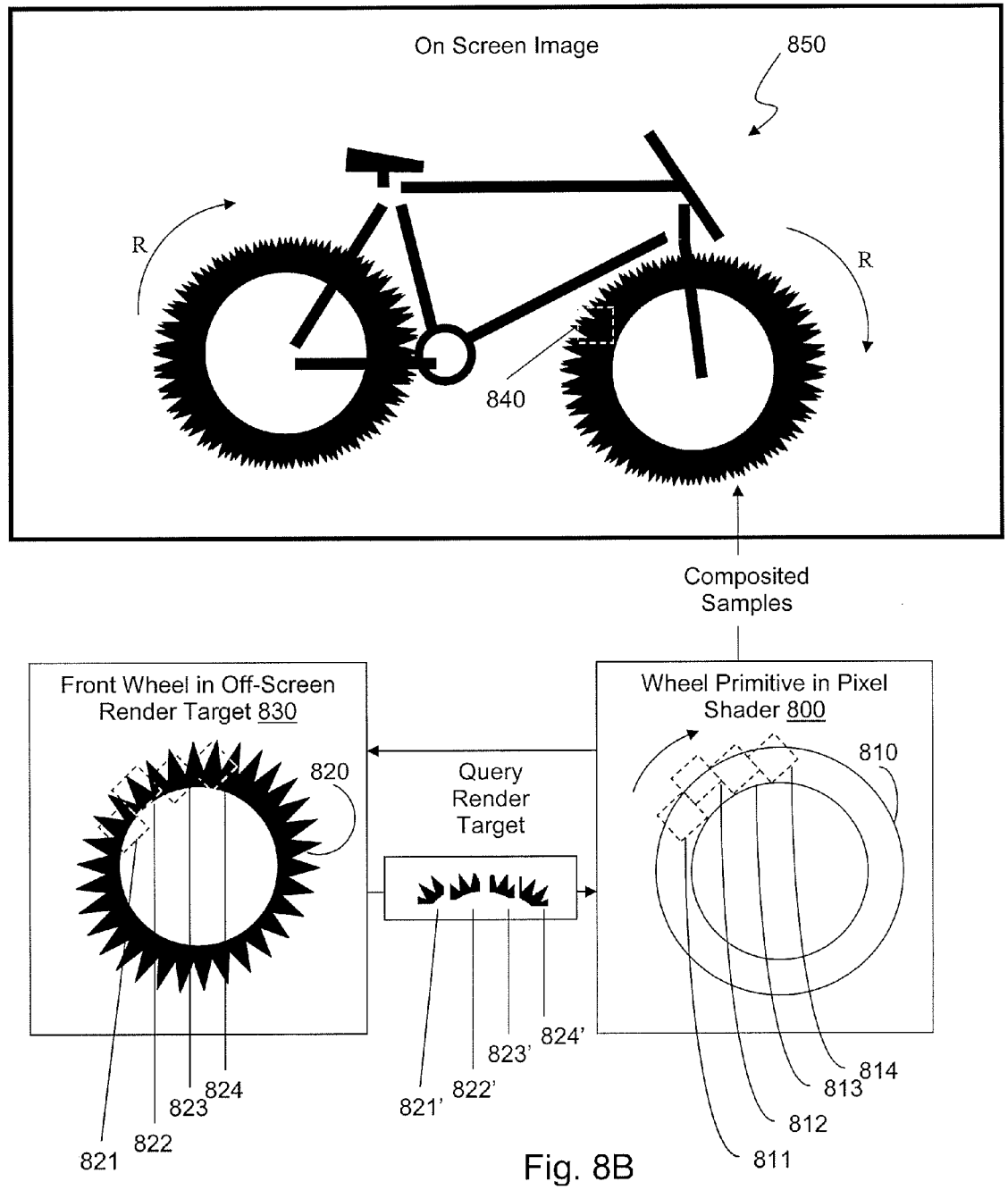
FIG. 8B depicts interactions between a pixel shader, off-screen render target and an on screen image according to certain embodiments of the invention.

In the particular example of FIG. 8B, pixel shader 800, using wheel primitive 810, generates samples 811, 812, 813, 814 of the three-dimensional position of the wheel pixel rotated about the rotational axis of the cylinder primitive. The samples generated by pixel shader 800 may be used to query pixel data associated with the front wheel 820 in off-screen render target 830. For example, where sample 811 is used to query off-screen render target 830, the corresponding position 821 on front wheel 820 is identified, and sample 821' is provided to pixel shader 800. By querying the render target for different rotations of the three-dimensional position of the pixel around the wheel's axis using a rotation matrix, data for multiple samples may be obtained. According to FIG. 8B, for each of positions 821, 822, 823 and 824, corresponding samples 821', 822', 823', 824' received by pixel shader 800 may include data related to the texel color (including alpha values) and depth values. The various samples 821', 822', 823' and 824' may be averaged by pixel shader 800, and in order to render the front wheel to an on-screen image 850, the pixel shader 800 may composite the sample point 840 to provide a blurred pixel with color and depth values from the off-screen render target.

According to further implementations, for sampling pixel data from the color and depth buffers in off-screen render target, the screen may be converted into UV space, i.e., mapping a two-dimensional image to represent a three-dimensional model, which allows a UV coordinate to be used to look up the color and depth values from the color and depth buffers associated with off-screen render target. A HLSL function that generates a single sample rotated around the wheel's axis of rotation, a "rotational sampling computational method," may be provided in the following manner:

```
struct SampleResult
{
    float4 color;
    float d;
};
SampleResult sample(
    float3 zIntersection,
    float3 zCenter,
    float zAngle )
{
    float s = sin(zAngle);
    float c = cos(zAngle);
    float3 axis = WheelAxis;
    // Generate a rotate-around-axis matrix...
    float3x3 rotm = {
        ( axis.x * axis.x ) − ( c * axis.x * axis.x ) + c,
        ( axis.x * axis.y ) − ( c * axis.x * axis.y ) − s * axis.z,
        ( axis.x * axis.z ) − ( c * axis.x * axis.z ) + s * axis.y,
        ( axis.y * axis.x ) − ( c * axis.y * axis.x ) + s * axis.z,
        ( axis.y * axis.y ) − ( c * axis.y * axis.y ) + c,
        ( axis.y * axis.z ) − ( c * axis.y * axis.z ) − s * axis.x,
        ( axis.z * axis.x ) − ( c * axis.z * axis.x ) − s * axis.y,
        ( axis.z * axis.y ) − ( c * axis.z * axis.y ) + s * axis.x,
        ( axis.z * axis.z ) − ( c * axis.z * axis.z ) + c };
    // Rotate
    float3 newPos;
    newPos = zCenter + mul( zIntersection − zCenter, rotm );
    // Project
    float4 projPos = mul( float4(newPos, 1), WheelTransViewProj );
    float2 newUv = (projPos / projPos.w).xy;
    // Convert to UV space
    newUv.y *= −1;
    newUv += 1;
    newUv *= 0.5;
    // Do the sample
    SampleResult res;
    res.color = tex2D( texture, newUv );
    res.d = tex2D( depth, newUv ).x;
    return res;
}
```

The pixel shader operates in a similar manner to that described in relation to FIG. 8B, and uses the UV data of a wheel's texture to composite a blurred wheel texture and render the wheel texture into the scene at a depth according to depth data retrieved from the depth buffer. According to certain embodiments, the number of samples taken per interval remains constant and thus as the velocity of the wheel changes, the spacing between samples changes.

Figure 1A:
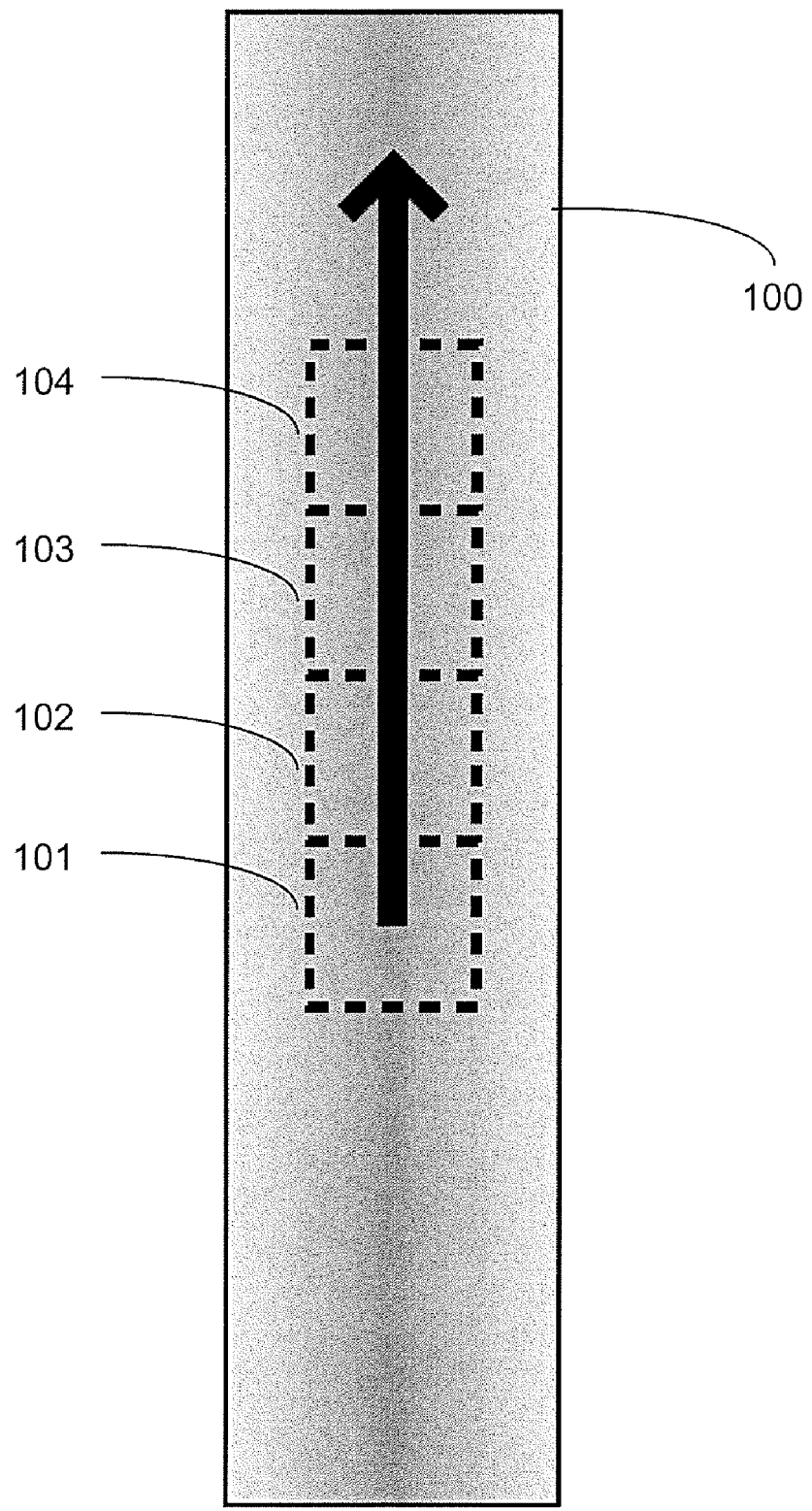
FIGS. 1A-B depict objects and samples taken in a linear direction from the objects according to prior methods.
Figure 1B:
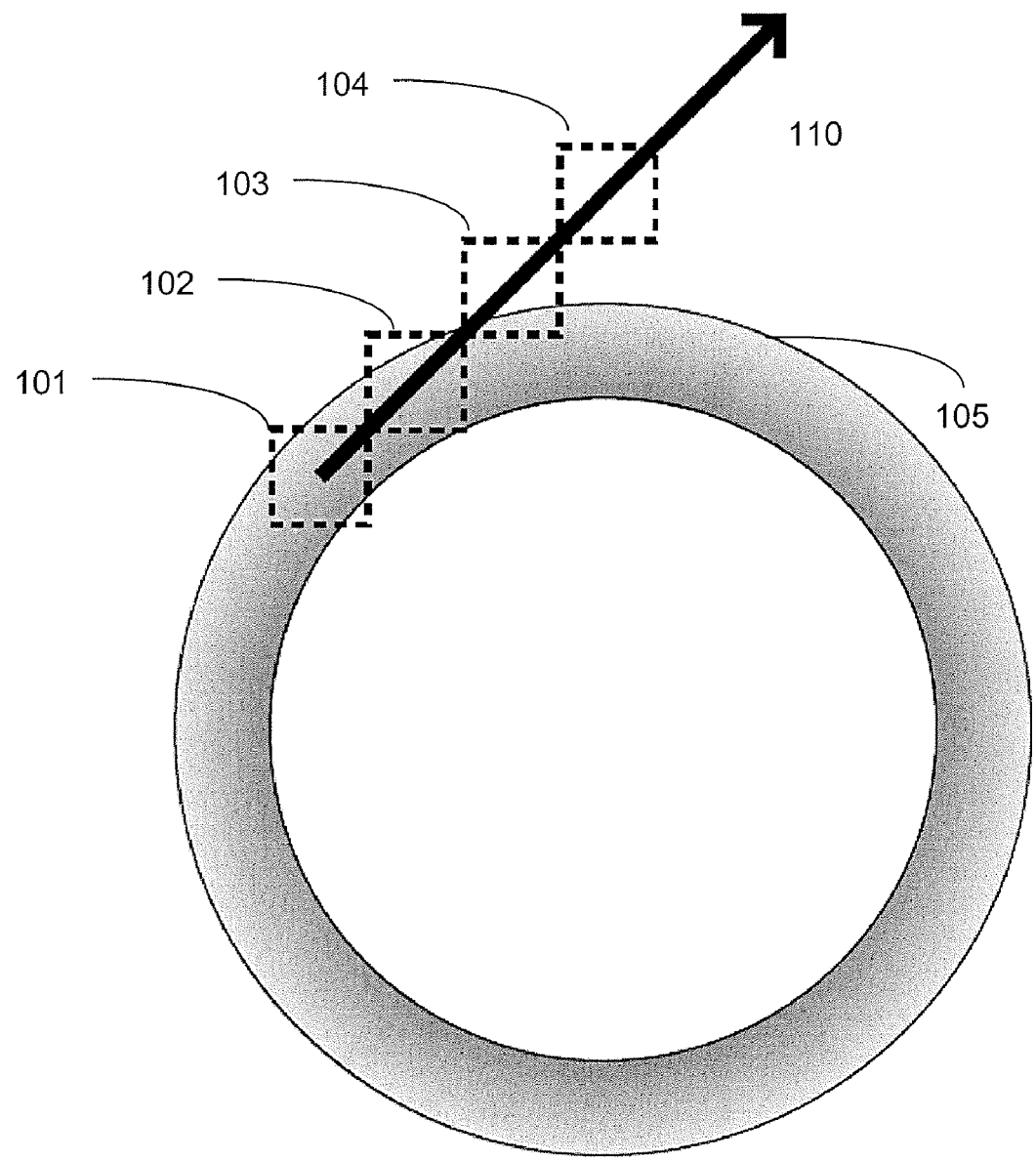

The advantages of the techniques of the present invention providing radial blur, as opposed to linear blur, may be more clearly understood by comparing the linear sampling taken along the wheel 105 depicted in FIG. 1B with the radial sampling taken along the wheel primitive 810 depicted in FIG. 8A. Providing realistic radial blur may be particularly advantageous for computer animation programs in which vehicles, i.e., cars, motorcycles, wheeled objects and objects having a radial movement component, stay in the same position on a computer screen with wheels spinning to simulate movement of the vehicle.

The wheel blurring technique of the present invention may be applicable to graphic depictions of real-world wheels having a variety of shapes, sizes and features. Knobby pieces on tire treads on a wheel, graphically depicted in FIG. 3 as knobs 301, may be blurred according to the wheel blurring technique of the present invention. In contrast to using depth buffer data in which depth value between the knobs is the far clip plane 302, it is desirable to find depth values around the wheel that are roughly the same. As a result, using a depth buffer to account for complex features is insufficient. In order to avoid gaps between the knobs 301 coming out as the far clip plane 302, the motion blurring technique of the present invention instead accounts for the depth values of the complex features in the near clip pane 303; as a result, wheel texture or other objects having geometric details in their texture may be realistically blurred.

Furthermore, according to various embodiments of the invention, render targets such as off-screen render target 830 may be provided for use with single or multiple objects. For example, one render target with color and depth buffers may be used in combination with a pixel shader in order to subject various objects to motion blur techniques in series. In this case, one of a plurality of objects may be subjected to the motion blur technique at a given time. In alternative embodiments, a render target such as off-screen render target 830 may be dedicated to a single object, e.g., a wheel, and where multiple objects are to be motion blurred using pixel shader and a render target, e.g., a front left wheel and a front right wheel, a render target is provided for each object. See e.g., render targets 510 in FIG. 5. In this case, one or more objects may be subjected to motion blur techniques simultaneously in their respective render targets 510 or a portion of the render targets, e.g., one or two, may be in operation at a given time. Accordingly, implementations of the present invention may involve performing motion blur techniques simultaneously on multiple objects, individually in a series, or as a mixture of the two.

In further examples, for instances where a system, such as CPU/system 500, and/or memory resources 505, processor, GPU 506 and/or pixel shader 550 functions are relatively free, multiple render targets 510 and associated depth buffers 530 may be dedicated to applying motion blur techniques to objects. In contrast, in instances when computer system functionalities are burdened by other processes, a single render target 510 may apply motion blur techniques to objects in series, or one of multiple render targets 510 may be operational at a given time. Moreover, where previously free processor functions become burdened by other processes, and where multiple off-screen render targets 510 are in use, one or more of the render targets may cease operations until motion blurring of objects in other off-screen render targets is complete. In addition, it will be understood by those of skill in the art that some render targets may be dedicated for use in applying motion blurring to objects, additional render targets, e.g., main render targets, may be provided that are dedicated for other purposes such as rendering the non-rotating portions of a scene, other render targets may be provided that have multiple functions.

According to certain implementations, render targets may be provided with a transform/projection matrix that is the same as the transform/projection matrix used in a scene, and the viewport may be adjusted in order for the object to fill the render target. For example, a viewport may be calculated by projecting the bounding box of an object, e.g., a wheel, into the screen space, and using the resulting two-dimensional bounding box as the viewport. According to further embodiments, the width and depth of a render target may correspond with the width and depth of the depth buffer.

Additionally, objects in render targets may be provided with or without blurring. According to the embodiment described in relation to FIGS. 8A and 8B above, a front wheel 820 having a non-blurred wheel texture with knobby surface features, for example, may be provided in a render target 830, and the wheel data may be used by the pixel shader 800 to perform the wheel blurring techniques. The blurred wheel may be composited into a scene by the pixel shader 800. In further embodiments, before compositing the blurred wheel into an on-screen image 850 a scene, the wheel may be pre-blurred by sending the pixel shader blurred wheel to a separate render target and using the pre-blurred wheel in the render target to composite into the scene. According to certain implementations, objects may be rendered on a screen 30 to 60 times per second.

Figure 9:
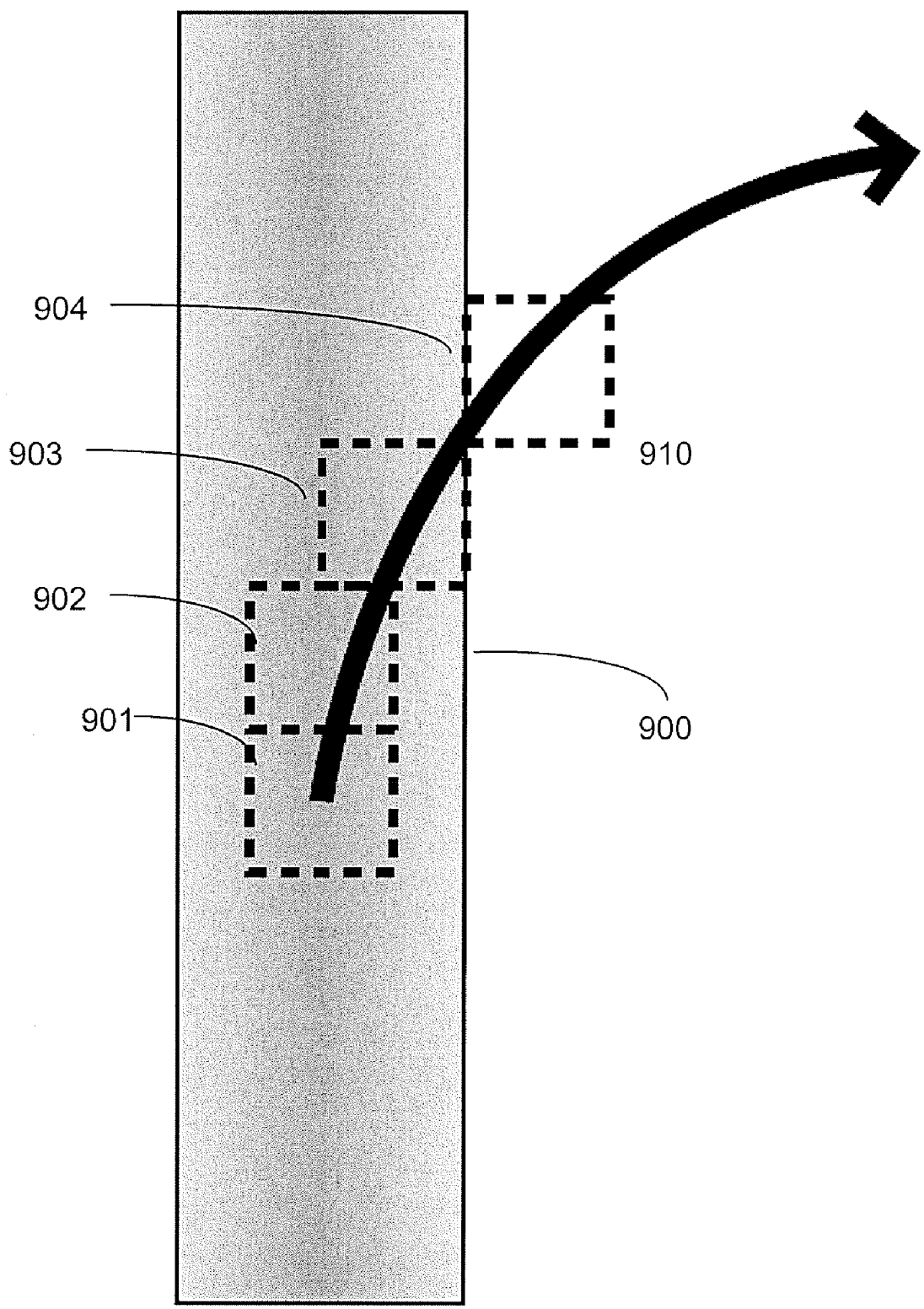
FIG. 9 depicts samples of an object moving linearly taken along a rotational axis.

It will be understood by those of skill in the art that the motion blurring technique of the present invention may be useful for blurring rotating objects. However, where objects are moving linearly, the motion blurring technique provided according to the implementations described above may be substituted with linear motion blurring techniques. This may avoid situations where applying a rotational blur to a linearly moving object would result in background sampling such as the object being shaded in FIG. 9. In FIG. 9, samples 901, 902, 903, 904 taken in a radial direction for an object 900 moving linearly, results in samples being taken from the background 910 as opposed to the moving object 900. Accordingly, for certain implementations, the direction of motion of an object may be determined in order to select the desired motion blurring technique. For a rotating object, the motion blurring technique of the present invention may be applied to blur the object, and for an object moving linearly, motion blurring techniques that account for linear movement may be applied. Linear motion blurring techniques are described in U.S. Pat. Nos. 5,995,111; 7,071,938; 7,227,544 and U.S. Patent Application Publication No. 2006/0227144, which are herein incorporated by reference in their entireties for any applicable purpose.

Programmable pixel shaders (e.g., Shader Model 3), which are able to provide a depth value for a pixel, may be used in combination with embodiments of the present invention to achieve wheel blur for wheels having a knobby surface or other surface relief. The present invention may be implemented in various computer platforms including PC platforms, Xbox 360 and Playstation using shader models such as Shader Model 3. However, the methods and systems according to the present invention may be implemented using paper, paperless, and/or computer methods. In some implementations, various combinations of software and hardware may be used, as would be apparent to those of skill in the art and as desired by the user. In addition, the present invention may be implemented in conjunction with a general purpose or dedicated computer system having a processor and memory components.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

The invention claimed is:

1. A computer implemented method for motion blurring rotating objects in a scene comprising:
    rendering an object from the scene in a render target, the render target comprising at least a color buffer and a depth buffer;
    generating one or more three-dimensional world space positions for a pixel in the object;
    sampling the pixel around an axis of rotation of the object at a plurality of rotational positions for the generated one or more three-dimensional world space positions containing the pixel by retrieving a set of color and depth data from the color and depth buffers for each of the plurality of rotational positions sampled, the sampling being performed on a pre-motion blurred scene; and
    compositing the retrieved sets of color and depth data for the plurality of rotational positions sampled to provide a blurred texture for the pixel in the object.

2. The method of claim 1, wherein generating one or more three-dimensional world space positions comprises generating one or more three-dimensional world space positions in a two-dimensional post-process.

3. The method of claim 2, wherein one or more three-dimensional world space positions generated for the object comprises one or more three-dimensional world space positions for a primitive representing an approximation of the object.

4. The method of claim 2, wherein generating one or more three-dimensional world space positions comprises generating UV coordinates representing the three-dimensional position of the pixel by identifying a line/object intersection point for the pixel, wherein the line/object intersection point corresponds to an intersection point of a line extending into the object from the scene.

5. The method of claim 4, wherein the set of calculations comprises a HLSL function for performing a line/cylinder intersection, said HLSL function comprising a "texel three-dimensional position computational method".

6. The method of claim 4, wherein sampling comprises retrieving the set of color and depth data for the pixel at a plurality of locations around the object's axis of rotation, each set of data retrieved at a radius of the object that is the same as the UV coordinate distance from the object's axis of rotation.

7. The method of claim 6, wherein the number of samples in the set of data remains constant and as a velocity of the wheel changes, a spacing between samples changes.

8. The method of claim 6, wherein retrieving the set of data comprises a HLSL function for generating a set of data for a sample rotated around the wheel's axis of rotation, said HLSL function comprising a "rotational sampling computational method".

9. The method of claim 8, wherein compositing comprises averaging the data generated from sampling the pixel around the axis of rotation.

10. The method of claim 4, wherein the object comprises a capped cylinder primitive.

* * * * *